(12) United States Patent
Park et al.

(10) Patent No.: US 12,372,205 B2
(45) Date of Patent: Jul. 29, 2025

(54) HYDROGEN STORAGE AND COMPRESSION SYSTEM

(71) Applicants: HYUNDAI MOTOR COMPANY, Seoul (KR); KIA CORPORATION, Seoul (KR); GRZ TECHNOLOGIES SA, Avenches (CH)

(72) Inventors: Jihye Park, Seoul (KR); Pyung Soon Kim, Suwon-si (KR); Hanjin Kim, Seoul (KR); Jihui Seo, Ulsan (KR); Jaeyong Lee, Seongnam-si (KR); Ji-Hoon Jang, Suwon-si (KR); Ernst Adler, Laupen (CH); Akhil Penmathsa, Fribourg (CH); Rui Li, Avenches (CH); Tai Sun, Laupen (CH); Daniel Brem, Balgach (CH); Bhargav Patel, Fribourg (CH); Noris Gallandat, Schwarzsee (CH); Konstantinos Bardis, Fribourg (CH)

(73) Assignees: HYUNDAI MOTOR COMPANY, Seoul (KR); KIA CORPORATION, Seoul (KR); GRZ TECNOLOGIES SA, Avenches (CH)

( * ) Notice: Subject to any disclaimer, the term of this patent is extended or adjusted under 35 U.S.C. 154(b) by 0 days.

(21) Appl. No.: 18/598,829

(22) Filed: Mar. 7, 2024

(65) Prior Publication Data
US 2025/0052374 A1    Feb. 13, 2025

(30) Foreign Application Priority Data

Aug. 7, 2023 (EP) ..................................... 23189911

(51) Int. Cl.
*F17C 11/00* (2006.01)

(52) U.S. Cl.
CPC ...... *F17C 11/005* (2013.01); *F17C 2221/012* (2013.01)

(58) Field of Classification Search
CPC ....... F17C 11/005; F17C 11/00; F17C 11/007; F17C 2221/00; F17C 2221/01;
(Continued)

(56) References Cited

U.S. PATENT DOCUMENTS 4,436,539 A * 3/1984 Ron ..................... B60H 1/3201
 62/4
5,469,913 A * 11/1995 Gamou ............. B60H 1/00492
 165/104.12
(Continued)

FOREIGN PATENT DOCUMENTS

EP         4141315 A1    3/2023
WO    2023025657 A1    3/2023

OTHER PUBLICATIONS

European Search Report cited in corresponding European patent application No. 23189911.3; Feb. 1, 2024; 4 pp.

*Primary Examiner* — Javier A Pagan
(74) *Attorney, Agent, or Firm* — Lempia Summerfield Katz LLC

(57) ABSTRACT

A hydrogen storage-compression system has a hydrogen storage-compression apparatus and a thermal management system. The apparatus includes a casing and a plurality of storage-compression units mounted within an internal chamber of the casing. Each storage-compression unit includes a container and a metal hydride for hydrogen storage-compression contained within the container. The storage-compression containers are interconnected by a hydrogen gas circuit flow system to a hydrogen inlet and outlet for connection to a hydrogen consumer and a hydrogen source. The thermal management system includes a thermal liquid circuit system and a heat exchanger system. The circuit
(Continued)

system includes a closed loop thermal liquid flow circuit, a thermal liquid flowing within the flow circuit, and a pump for pumping the thermal liquid in the flow circuit. The flow circuit is connected to a liquid inlet and outlet of the casing for flowing thermal liquid through the internal chamber around the containers of the storage-compression units for cooling or heating thereof. The flow circuit is coupled to a first heat exchanger thermally coupled to heating source and to a second heat exchanger thermally coupled to a cooling source. The system includes a control system connected to the circuit system for controlling the flow of the thermal liquid in the circuit and through the heat exchangers.

15 Claims, 5 Drawing Sheets

(58) Field of Classification Search
CPC ........... F17C 2221/012; F17C 2221/03; C01B 3/065; C01B 3/0031
See application file for complete search history.

(56) References Cited

U.S. PATENT DOCUMENTS

| 5,862,855 | A | * | 1/1999 | Balk | ........................ | C09K 5/16 |
| | | | | | | 62/480 |
| 2017/0198947 | A1 | * | 7/2017 | Bahar | ..................... | F25B 17/12 |
| 2019/0093825 | A1 | * | 3/2019 | Eriksen | ................. | F17C 11/005 |
| 2022/0364773 | A1 | | 11/2022 | Bahar | | |

* cited by examiner

HYDROGEN STORAGE AND COMPRESSION SYSTEM

RELATED APPLICATION DATA

This patent claims the benefit of and priority to European Application EP23189911.3 filed on Aug. 7, 2023, the entire contents of which are incorporated herein by reference.

TECHNICAL FIELD

The present disclosure relates to a hydrogen storage and compression system using metal hydrides.

BACKGROUND

Hydrogen storage is a key step in the decarbonisation of fossil fuel technologies by renewable energy.

Metal hydrides are of high interest for the compression of hydrogen as many metals and alloys are capable of reversibly absorbing significant amounts of hydrogen and compressing it through the addition of heat. Molecular hydrogen is dissociated at the surface of the metal hydride before absorption. Two H atoms then recombine to form $H_2$ upon desorption. The hydrogen absorption reaction in the material is typically exothermic (producing heat) whereas the hydrogen desorption reaction is conversely endothermic (absorbing heat). A metal hydride compression system may be used as a unit that desorbs and supplies hydrogen isobarically and pulsation-free at a required elevated pressure level by adding the heat needed for the desorption.

Challenges of hydrogen compression include ensuring a high heat transfer rate and reaching a high-pressure ratio with a single system, while ensuring a high level of safety. Given the thermodynamic behaviour of metal hydride materials, obtaining a high-pressure ratio requires a high-temperature range of the system, i.e., the difference between the absorption temperature ($T_{cold}$) and the desorption temperature ($T_{Hot}$) is sufficiently large.

A further challenge also pertains to maximizing the overall efficiency. The energy losses linked with the transient processes (heat up and cool-down processes) as well as auxiliary power consumption (pumping power) should be minimized.

SUMMARY

In view of the foregoing, it is an object of this disclosure to provide a hydrogen storage-compression system that provides for a high pressure ratio yet is energy efficient, cost-effective, and safe.

It is advantageous to provide a hydrogen storage-compression system that is economical to operate and maintain.

It is advantageous to provide a hydrogen storage-compression system that is reliable and compact.

Objects of this disclosure have been achieved by providing a system according to various advantageous features of embodiments of the disclosure.

Disclosed herein is a hydrogen storage-compression system having a hydrogen storage-compression apparatus and a thermal management system. The hydrogen storage-compression apparatus includes a casing and a plurality of storage-compression units mounted within an internal chamber of the casing. Each storage-compression unit has a container and a metal hydride configured for hydrogen storage-compression contained within the container. The plurality of storage-compression containers is interconnected by a hydrogen gas circuit flow system to a hydrogen inlet and outlet for connection to a hydrogen consumer and a hydrogen source.

The thermal management system includes a thermal liquid circuit system and a heat exchanger system. The thermal liquid circuit system has a closed loop thermal liquid flow circuit, a thermal liquid contained and flowing within a thermal liquid flow circuit, and a thermal liquid pump for pumping the thermal liquid in the thermal liquid flow circuit. The thermal liquid flow circuit is connected to a thermal liquid inlet and a thermal liquid outlet of the casing for flowing the thermal liquid through the casing internal chamber around the containers of the storage-compression units for cooling or heating thereof. The thermal liquid flow circuit is coupled to at least a first heat exchanger thermally coupled to heating source and to a second heat exchanger thermally coupled to a cooling source.

In an embodiment, the system further includes a control system connected to the thermal liquid circuit system for controlling the flow of the thermal liquid in the circuit and through the heat exchangers.

Avoiding phase change within the thermal management system is a significant advantage.

In an embodiment, the thermal management system includes a dry cooler thermally coupled to the thermal liquid flow circuit.

In an embodiment, the thermal management system includes one or more additional heat exchangers thermally coupled to the thermal liquid flow circuit. For example, the additional heat exchangers may include a heat exchanger for waste heat recovery thermally coupled to an industrial process output, and/or a heat exchanger for free cooling.

In an embodiment, the thermal liquid is selected from any one or more of a water-ethylene glycol mixture, a silicon oil, or a synthetic hydrocarbon oil.

In an embodiment, the thermal liquid includes principally, or consists of, a water-ethylene glycol mixture in a proportion in a range of about 45% water to 55% ethylene glycol to about 55% water to 45% ethylene glycol. In another embodiment, the proportion is in a range of about 50% water-50% ethylene glycol.

In an embodiment, the metal hydride contained in the storage-compression units are of the material class AB2 with a typical composition of $Ti_x Zr_y Cr_a Mn_b Fe_c Ni_d Cu_e V_f Re_g$. In the composition, x, y, a, b, c, and d are molar ratios, Re is selected from La and Ce; $0.2 \leq x \leq 0.95$; $0.05 \leq y \leq 0.45$; $0.001 \leq a \leq 1$; $0.3 \leq b \leq 2$; $0.01 \leq c \leq 0.6$; $0.005 \leq d \leq 1.5$; $0 \leq e \leq 0.1$; $0 \leq f \leq 0.5$; $0.01 \leq g \leq 0.05$; and $a+b+c+d+e+f+g = 1.9$ to $2.3$.

In an embodiment, the metal hydrides contained in the storage-compression units are of the material class AB5 with a typical composition of $La_x Ce_y Ml_{(1-x-y)} Ni_a Co_b Fe_c M_d$. In the composition, x, y, a, b, c, and d are molar ratios, where Ml is at least one element selected from Y, Ti, Zr and M is selected from Cu and Mn; $0.15 \leq x \leq 0.95$; $0.05 \leq y \leq 0.85$; $0 \leq (1-x-y) \leq 0.1$; $3.8 \leq a \leq 4.2$; $0.1 \leq b \leq 1.2$; $0.01 \leq c \leq 0.3$; $0 \leq d \leq 0.1$; and $4.8 \leq (a+b+c+d) \leq 5.15$.

In an embodiment, the casing and thermal liquid flow circuit are configured to withstand an internal pressure of at least 2 bar.

In an embodiment, the control system is connected to valves of the hydrogen gas circuit flow system and to pressure sensors and temperature sensors connected to the hydrogen gas circuit flow system to control the inflow and outflow of hydrogen from the hydrogen storage compression system to and from the hydrogen source and the hydrogen consumer.

In an embodiment, each storage-compression container includes a tubular container wall having a diameter D in a range of about 1.5 cm to 10 cm. Adjacent ones of the plurality of storage-compression containers of the at least one multi-container unit are separated by a gap G having a length in a range of 0.02×D to 1×D.

In an embodiment, the diameter D of the tubular container wall of each storage-compression container is in a range of about 2 cm to 8 cm. In one example, the diameter is in a range of about 3 cm to 6 cm.

In an embodiment, the gap G between the storage-compression containers is in a range of about 0.1×D to 0.5×D.

In an embodiment, the storage-compression containers have a length in a range of about 60 cm to 200 cm. In one embodiment, the length is in range of about 80 cm to 150 cm.

In an embodiment, the hydrogen storage-compression system is used as a near-isobaric hydrogen supply system to absorb and desorb hydrogen at elevated pressure. In one embodiment, the elevated pressure is greater than 50 bar. In one embodiment, the elevated pressure is greater than 200 bar. In one embodiment, the system may desorb hydrogen at substantially constant pressure with a minimal change in temperature. In one embodiment, the temperature change may be less than 40° C. In one embodiment, the temperature change may be in a range of about 20° C. to 30° C.

BRIEF DESCRIPTION OF THE DRAWINGS

Further objects and advantageous features of the disclosure should be apparent from the claims, from the detailed description, and the annexed drawings, in which:

DETAILED DESCRIPTION

Figure 1:
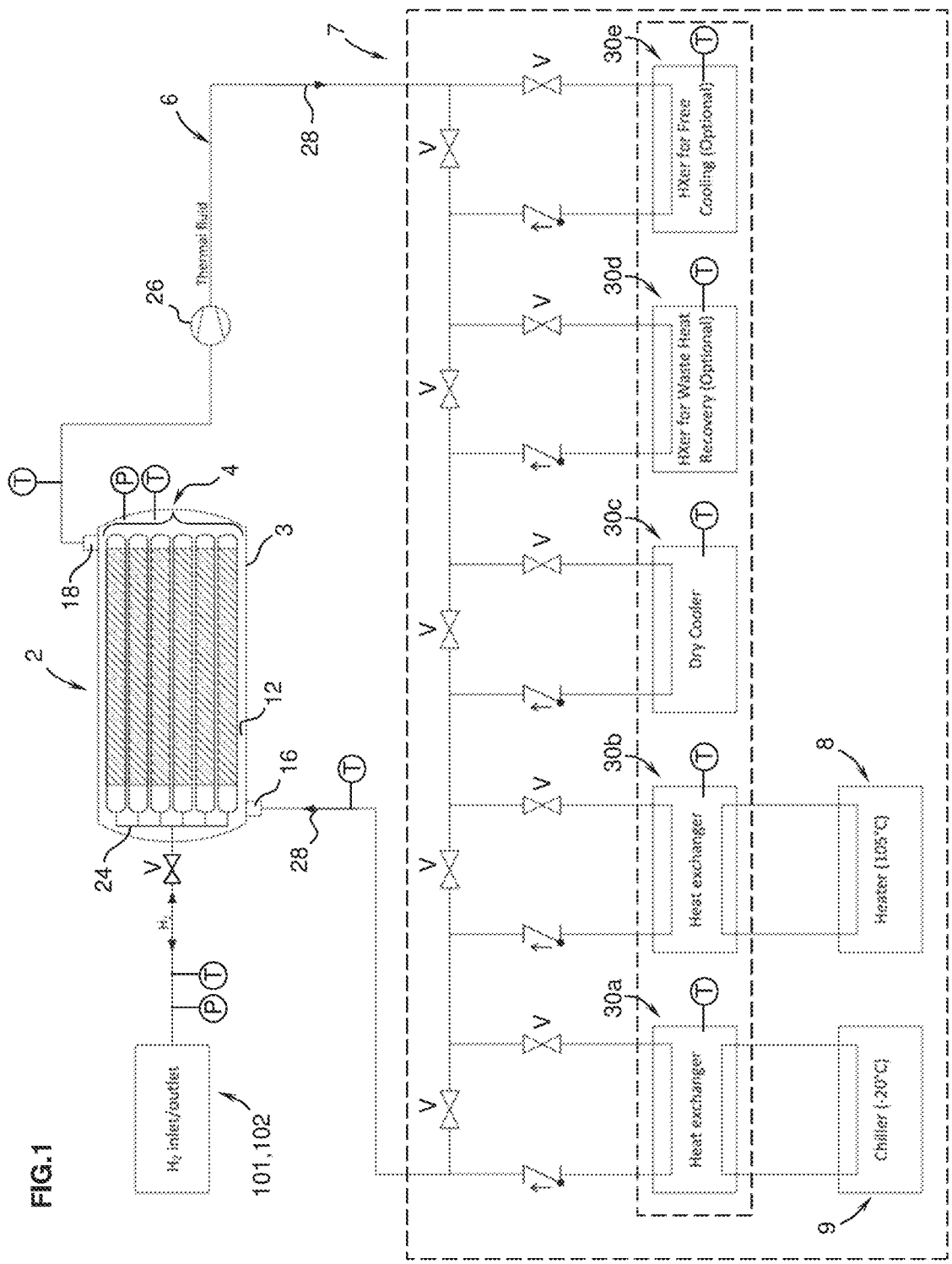
FIG. 1 is a simplified block diagram of a hydrogen storage-compression system according to an embodiment of the disclosure.
Figure 2:
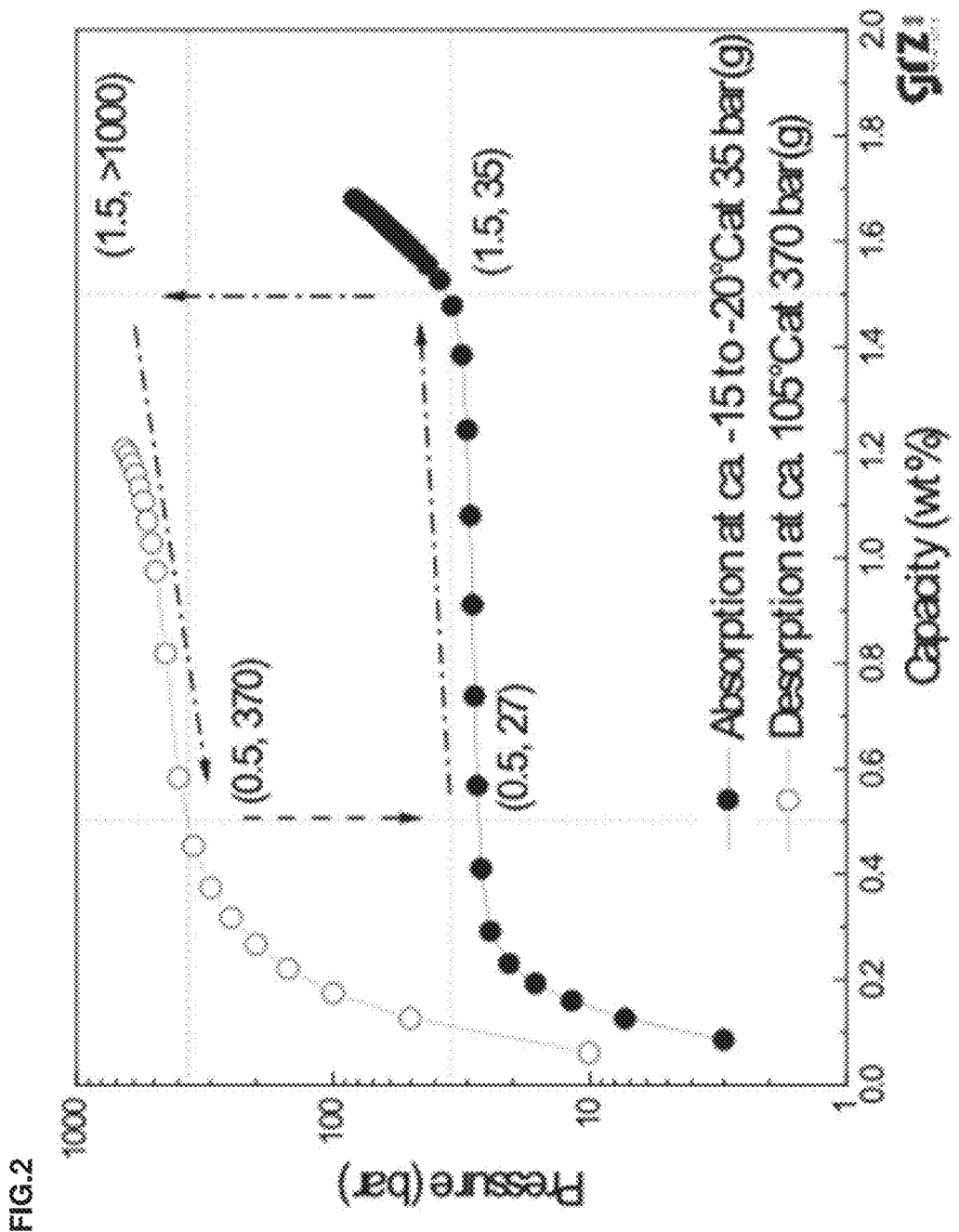
FIG. 2 is a plot of pressure (bar) versus storage capacity (weight-percentage) of a metal hydride material of a hydrogen storage-compression system according to an embodiment of the disclosure.
Figure 3:
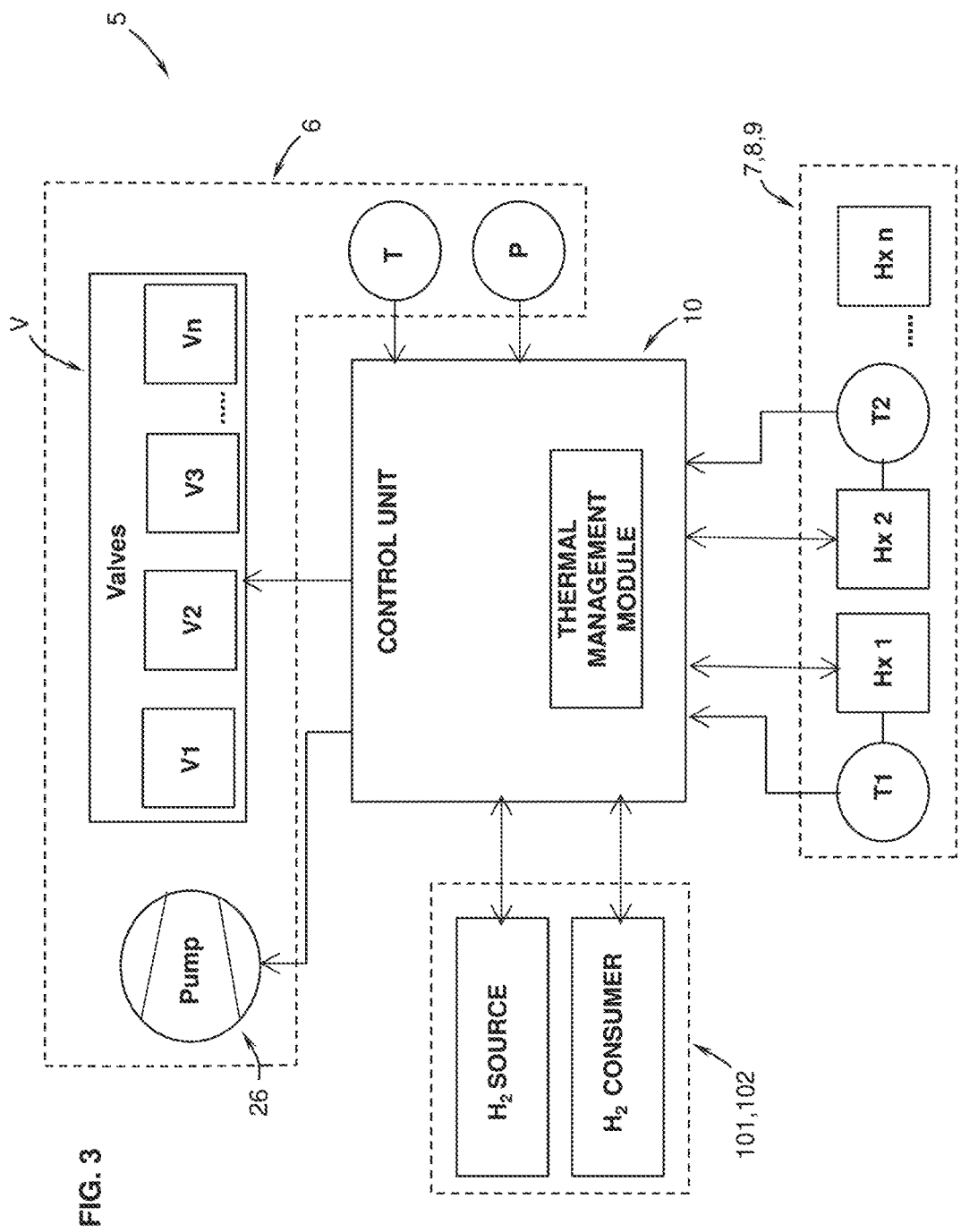
FIG. 3 is a block diagram schematically illustrating a control system of a hydrogen storage-compression system according to an embodiment of the disclosure.
Figure 4A:
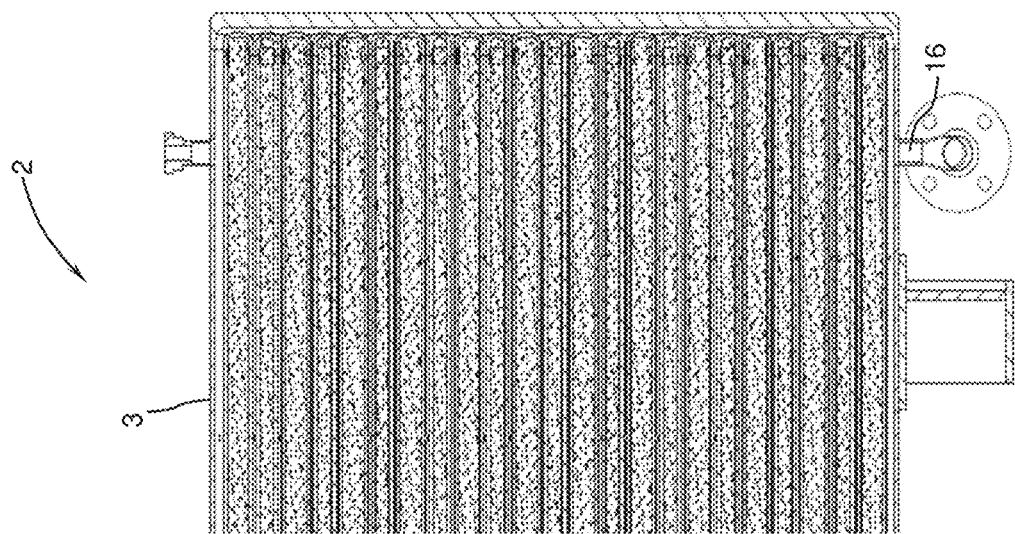
FIG. 4a is a longitudinal cross-section view of a casing and storage-compression units of a hydrogen storage-compression system according to an embodiment of the disclosure.
Figure 4A:
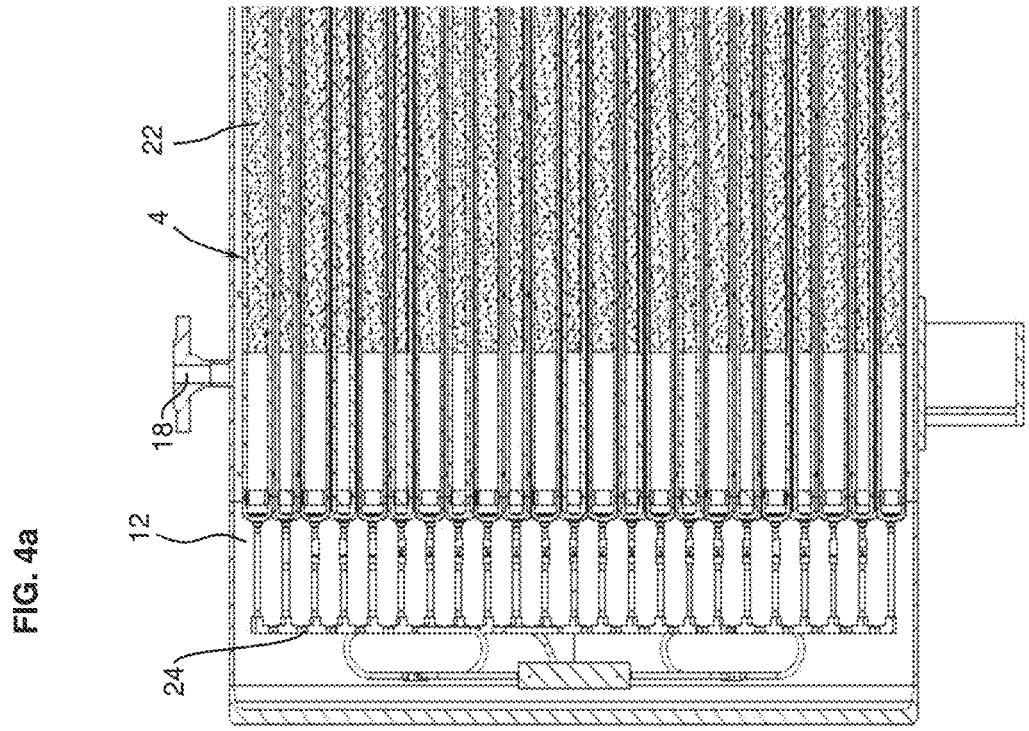
Figure 4B:
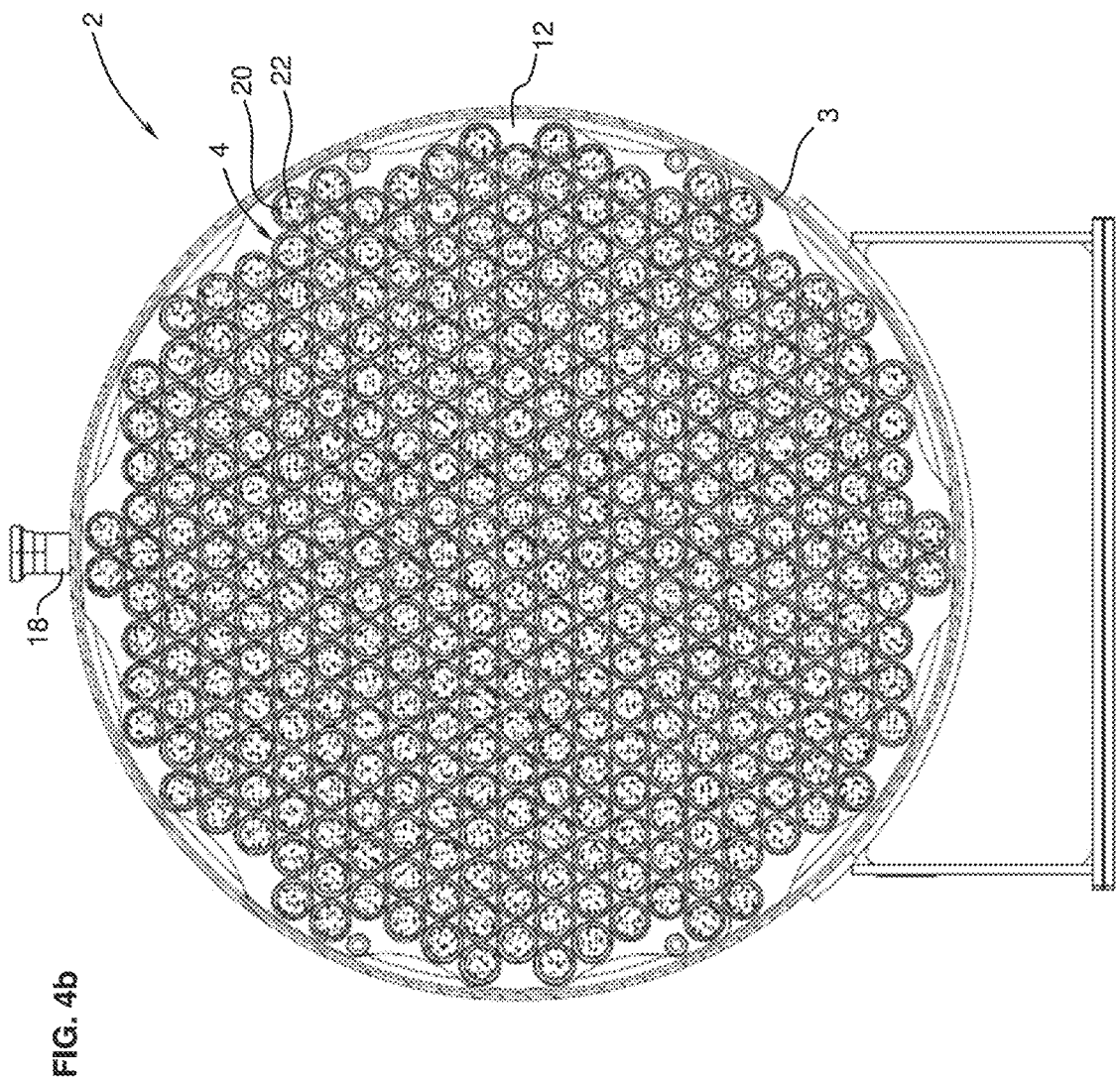
FIG. 4b is a transverse cross-section view of a casing and storage-compression units of a hydrogen storage-compression system according to an embodiment of the disclosure.

When a component, device, element, or the like of the present disclosure is described as having a purpose or performing an operation, function, or the like, the component, device, or element should be considered herein as being "configured to" meet that purpose or to perform that operation or function. Referring to the figures, a hydrogen storage-compression system 1 includes a hydrogen storage-compression apparatus 2 and a thermal management system 5.

The hydrogen storage-compression system 1 is connected to a hydrogen source 101 and a hydrogen consumer 102. The hydrogen source may, for example, be an electrolyzer, a hydrogen network connected via a pipeline, a hydrogen trailer, or low- or high-pressure hydrogen cylinders. Other possibilities include hydrogen from a steam methane reforming or biomass gasification plant. The hydrogen consumer may for instance be a vehicle such as a passenger car, a truck, a bus, or a ship using compressed hydrogen typically stored in high-pressure cylinders and utilized either in a fuel cell or combustion engine. Hydrogen may also be used in combined heat and power cycles or in other industrial processes, either as a process component (e.g. ammonia) or for high-temperature heat generation (metal processing).

The hydrogen exits the metal hydrides compression during the desorption process is at a high temperature, up to 130° C. The maximum possible temperature inside the high-pressure storage tanks has to follow certain requirements and safety standards during the refuelling process. The hydrogen storage-compression system according to embodiments of this disclosure is configured to compress hydrogen at high pressure for filling a hydrogen storage tank of the hydrogen consumer. The pressure is typically greater than 350 bar, and may be up to over 900 bar, depending on the intended consumer application.

The hydrogen storage-compression apparatus 2 includes a casing 3 and a plurality of storage-compression units 4 mounted in the casing 3. Each storage-compression unit 4 has a container 20 and a metal hydride 22, typically in powder or granular form, provided within the container. The plurality of containers 22 of the plurality of storage-compression units 4 are interconnected by a gas circuit flow system 24 comprised of gas flow tubes and valves interconnected to the hydrogen source 101 and the hydrogen consumer 102 via a hydrogen inlet/outlet system through a wall of the casing 3. The casing 3 sealingly surrounds and encloses the storage-compression units 4 and hydrogen inlet/outlet such that a liquid flowing through the internal chamber 12 of the casing is sealingly contained within the casing, separated from the external environment surrounding the casing.

The casing 3 and storage compression units 4 may comprise a configuration that is similar to the casing and storage-compressing units described in PCT publication no. WO 2023025657, except for the differences described herein relating inter alia to the thermal management system 5, thermal fluid, and thermal fluid circuit for cooling and heating of the storage-compression units 4 mounted within the casing 3.

The casing 3 surrounds the casing internal chamber 12 within which the storage-compression units 4 are mounted. The casing includes a thermal liquid inlet 16 on one end and one side of the casing and includes a thermal liquid outlet 18 at an opposite end and opposite side of the casing 3. Thus, when a thermal liquid 28 flows from the thermal liquid inlet 16 to the thermal liquid outlet 18, the thermal liquid flows around the outside of the containers 20 of the storage compression units 4. The thermal liquid 28 that flows around and across the outside of the containers 20 serves to cool or to heat the storage containers 4, depending on the hydrogen compression process stage and corresponding needs of the hydrogen absorption or desorption process.

Each storage-compression container 20 may include a tubular container wall having a diameter D in a range of about 1.5 cm to 10 cm. Adjacent ones of the plurality of storage-compression containers of the at least one multi-container unit may be separated by a gap G having a length in a range between about 0.02×D to 1×D.

In some embodiments, the diameter D of the tubular container wall of each storage-compression container is in a range of about 2 cm to 8 cm. In one embodiment, the diameter D is in a range of about 3 cm to 6 cm.

In some embodiments, the gap G between the storage-compression containers is in a range from 0.1×D to 0.5×D.

In some embodiments, the storage-compression containers have a length in a range of about 60 cm to 200 cm. In one embodiment, the length is in range of about 80 cm to 150 cm.

The above parameters allow providing a hydrogen storage-compression apparatus 2 with excellent heat transfer properties between the metal hydride in the storage compression units and the thermal liquid flowing through the internal chamber 12 of the casing 3. The above parameters achieve these results while providing a hydrogen storage-compression apparatus 2 with a size and configuration that makes it easily transportable by vehicles such as trucks, boats, and ships, and easy to install and maintain.

The thermal management system 5 includes a heat exchanger system 7 and a thermal liquid circuit system 6 interconnecting the thermal liquid inlets and outlet 16, 17 of the casing 3 to the heat exchanger system 7. The thermal liquid circuit system 6 has a thermal liquid pump 26 for pumping the thermal liquid through the casing chamber 12 and heat exchanger system 7 and has a plurality of valves V for controlling the flow of thermal liquid 28 through the heat exchanger system 7.

The heat exchanger system 7 includes at least a first heat exchanger 30a coupled to a heating source 8 and includes at least a second heat exchanger 30b coupled to a cooling source 9. The heat exchanger system 7 may comprise additional heat exchangers, such as for example, a heat exchanger for waste heat recovery 30d and a heat exchanger for free cooling 30e. The heat exchange system 7 may optionally further comprise a dry cooler 30c. The dry cooler, also known as an air-cooled condenser or air-cooled heat exchanger, is a device used in the heat exchanger system to dissipate or absorb heat to/from the surrounding air without using water evaporation. The dry cooler includes a finned-tube heat exchanger, similar to a radiator, where the heat is exchanged between the thermal fluid and the ambient air.

In the present disclosure the dry cooler provides cooling or heating power during the transient phases of the heat up or cool down. In particular, the dry cooler allows the heat-up from the absorption temperature to the ambient temperature and the cool-down from the desorption temperature to the ambient temperature without the need of cooling or heating machine. Therefore, it allows the reduction of the overall system energy consumption.

A plurality of valves V interconnect the thermal liquid circuit (channels, pipes) 6 to the respective heat exchangers for controlling the flow of the thermal liquid through the required heat exchanger as a function of the process stage and requirements. The first heat exchanger 30a coupled to a heating source 8 is configured to heat the thermal liquid flow in the thermal liquid circuit system 6 to a temperature of 105° degree centigrade or higher, and in one embodiment to a temperature of up to 130° or more. The second heat exchanger 30b coupled to the cooling source 9 is configured to cool the thermal liquid 28 flowing in the thermal liquid circuit system to a temperature of below at least −20°, and in one embodiment below −300 centigrade.

The thermal liquid circuit system 6 is configured in one embodiment to withstand a pressure of up to 2 bar. Thus, the thermal liquid 28 contained within the thermal liquid circuit system 6 may circulate at up to 2 bar and remain in a liquid phase from the temperature of −35° C. to +160° C. Example thermal liquid compositions are described in more detail herein below.

The thermal management system 5 comprises a control system 10 including a control unit connected to the thermal liquid pump 26 and to the valves V to control operation of the pump and the various valves during the hydrogen absorption and desorption processes. The control unit is further connected to the heat exchanger system 7 and to temperature sensors T. and the control unit is optionally connected to pressure sensors P for control of the heating and cooling processes of the thermal liquid flowing in the thermal liquid circuit 6 and through the casing internal chamber 12.

A pressure and/or temperature sensor may be coupled to the thermal liquid 28 in the casing chamber 12 and additional temperature and/or pressure sensors may be positioned at different points along the thermal liquid circuit system 6. The control unit of the control system 10 is further connected to the hydrogen source and consumer 101, 102 and to valves interconnecting the hydrogen storage-compression apparatus 2 to the hydrogen source and consumer 101, 102 for controlling the input and output of hydrogen between the hydrogen source and consumer 101, 102 and the storage-compression units 4 of the hydrogen storage-compression apparatus 2.

A thermal management software module is installed in the control unit to manage the control of the pump, valves, and heat exchanger system as a function of the heating or cooling needs, depending on the hydrogen absorption or desorption processes and the inlet and outlet pressures between the hydrogen storage-compression units 4 and the hydrogen source/consumer 101, 102.

The use of a thermal liquid that remains in a liquid single phase from a temperature that may range between −30° centigrade to +130° centigrade, typically from about −20° centigrade to about 120° centigrade, circulating in a closed circuit that may be coupled to separate heat exchangers for cooling and heating, allows for an efficient, safe, compact, and cost-effective operation of a hydrogen storage and compression system for high pressures exceeding 350 bar, and up to about 900 bars. The use of heat exchangers coupled to a closed thermal liquid circuit also advantageously allows the coupling of external waste heat or free cooling devices from industrial processes that allow compression of hydrogen to be performed in an energy efficient manner.

Thermal Liquid Medium

The basic requirement from the thermal medium is to provide sufficiently high heat transfer rate within the employed temperature range, which for suitable materials is between −30.0° C. and 120° C. It is well known that a fluid is more suitable than a gas for heat transfer applications as a result of the higher thermal capacity (density, heat capacity) and increased thermal conductivity. For reasons of simplicity, phase change is also avoided. In addition, the thermal medium should have low enough viscosity such that it is suitable for usage in the system pumps and low toxicity, corrosion. and oxidation potential. When a non-pressurized vessel is employed, the flash point also becomes relevant, particularly if it is within the operating temperature range of the compressor. If this is the case, proper safeguards need to be in place to guarantee that any vapor formed is safely vented to the atmosphere.

Based on the aforementioned requirements, different thermal media can be employed. In an embodiment, a mixture of water-ethylene glycol, for example, at equal ratio (50%: 50%) under 1 bar(g) pressure (or more) can be utilized as it is liquid under the given temperature and pressure range.

In another embodiment, the thermal liquid may comprise or consist of a thermal oil that can be under atmospheric conditions in an open enclosure (not a pressure vessel). Examples of such a thermal medium include Therminol D-12, Silicon Oil, or FRAGOLTHERM 620, to name a few. Different grades are possible based on the required viscosity and heat transfer properties. The table below summarizes the thermal medium properties:

| | Thermal Media Properties Comparison | | | | | |
|---|---|---|---|---|---|---|
| Medium [—] | Glycol: 50 / Water: 50 Typical Quality | | Silicon Oil 10 mm²/s @ 25° C. | | Therminol D-12 1.55 mm²/s @ 25 C. | |
| Temperature [° C.] | −27 | 120 | −27 | 120 | −27 | 120 |
| Density [kg/m³] | 1'133 | 1'054 | 942 | 614 | 798 | 687 |
| Heat Capacity [J/kg-k] | 3'185 | 3'550 | 1'430 | 1'587 | 1'900 | 2'500 |
| Density × Heat Capacity [MJ/m³-k] | 3.60 | 3.74 | 1.34 | 0.97 | 1.51 | 1.71 |
| Viscosity [mm²/s] | 38.6 | 4.1 | 34.3 | 2.16 | 5.76 | 0.55 |
| Flash Point [° C.] | 110 | | 120 | | 62 | |

Metal Hydride Materials

In an embodiment, the metal hydrides contained in the storage-compression units 4 are of the material class AB2 with a typical composition of $Ti_xZr_yCr_aMn_bFe_cNi_d$-$Cu_eV_fRe_g$. In the composition, x, y, a, b, c, and d are molar ratios, Re is selected from La and Ce; $0.2 \leq x \leq 0.95$; $0.05 \leq y \leq 0.45$; $0.001 \leq a \leq 1$; $0.3 \leq b \leq 2$; $0.01 \leq c \leq 0.6$; $0.005 \leq d \leq 1.5$; $0 \leq e \leq 0.1$; $0 \leq f \leq 0.5$; $0.01 \leq g \leq 0.05$; and $a+b+c+d+e+f+g = 1.9-2.3$.

In another embodiment, the metal hydrides contained in the storage-compression units 4 are of the material class AB5 with a typical composition of $La_xCe_yMl_{(1-x-y)}Ni_aCo_bFe_cMd$. In the composition, x, y, a, b, c, and d are molar ratios, where Ml is at least one element selected from Y, Ti, Zr and M is selected from Cu and Mn; $0.15 \leq x \leq 0.95$; $0.05 \leq y \leq 0.85$; $0 \leq (1-x-y) \leq 0.1$; $3.8 \leq a \leq 4.2$; $0.1 \leq b \leq 1.2$; $0.01 \leq c \leq 0.3$; $0 \leq d \leq 0.1$; and $4.8 \leq (a+b+c+d) \leq 5.15$.

Within the scope of the disclosure, hydrogen storage metals are not limited to AB2 or AB5 materials but can also be applied to materials of other classes showing similar thermo-chemical behaviors.

Example of a Process of an Industrial Application

The hydrogen storage-compression system operating in a full cycle may include the following phases in the presented order. These phases may include: (i) absorption; (ii) heat-up; (iii) desorption, and (iv) cool-down. An example of these processes is described in more detail below. The values indicated correspond to an embodiment with a thermal liquid consisting of water-ethylene glycol mixture at equal ratio (50%:50%) under 1 bar(g) pressure.

Absorption

Hydrogen is absorbed into the storage-compression units 4 at a nearly isobaric process from an external source. The pressure of the $H_2$ source typically ranges from 25 bar(g) to 40 bar(g) and most commonly is 35 bar(g) for a typical electrolyzer. Since the absorption reaction is highly exothermic (results in release of heat), the storage-compression units 4 need to be cooled to maintain the developed pressure below the charging one. The cooling power provided needs to also compensate for the inevitable heat-up by the ambient, which also tends to increase the developed storage-compression unit hydrogen pressure. This energy requirement is mainly a function of the metal hydride material absorption enthalpy, which is 18.0 $kJ/mol_{H2}$ for the suitable material, resulting in an energy requirement of 87 $kWh_{th}$ or around 2.7 $kWh_{th}/kg_{H2}$ (both values include the heat-up compensation energy).

The absorption process time requirement depends on the type of $H_2$ source and can range from 1 to 8 hours, with a resulting cooling power of 10.9 $kW_{th}$ to 87 $kW_{th}$. For a suitable metal hydride material, the inlet fluid temperature to the compressor is generally between −30° C. to −0° C., with a typical value of −25.0° C. to −20° C. The typical cooling flow rate is 7.5 m³/h. The thermal liquid flows through the cooling heat exchanger 30a and by-passes the dry cooler 30c and heating heat exchanger 30b. It should be mentioned that the inlet temperature is lower than the temperature of the material PCT curve corresponding to the absorption pressure as the exothermic reaction generates an inverse-parabolic temperature profile within the metal hydride.

| Absorption | | | | | |
|---|---|---|---|---|---|
| Hydrogen storage-compression apparatus batch capacity ($kg_{H2}$) | 28 | 28 | 28 | 28 | 28 |
| Duration (min) | 6 | 10 | 20 | 39 | 155 |
| $H_2$ Flow Rate ($kg_{H2}$/h) | 262 | 175 | 86 | 43 | 11 |
| Thermal Power ($kW_{th}$) | 739 | 493 | 243 | 122 | 31 |
| $T_{TF, in}$ | −25 | −25 | −25 | −25 | −25 |
| $T_{TF, out}$ | −22 | −22 | −22 | −22 | −22 |
| TF Flow Rate (1000 · kg/h); Water-Glycol (50%/50%) | 268 | 179 | 88 | 44 | 11 |
| TF Flow Rate (1000 · kg/h); Therminol | 350 | 233 | 114 | 57 | 14 |

Desorption

During the desorption process, hydrogen is released from the hydrogen storage-compression apparatus 2 to a hydrogen consumer 102 such as a hydrogen-powered vehicle, i.e., a truck or a bus, which requires refueling at 350 bar or more. The desorption pressure can be adjusted through the material and the thermal medium temperature selection. The vehicle refueling time required dictates the desorption rate of hydrogen. The refueling time can be on the order of a few minutes e.g., 5-15 min up to several hours e.g., 3-8 h. The storage-compression unit 4 desorption pressure is a function of the final mass to be delivered, the desorption mass flow rate, and the temperature of hydrogen before entering the hydrogen-powered vehicle. As an example, for an application such as slow refueling at 6 $kgH_2$/h, which results in 5 h, 20 min refueling time for a Hyundai Xcient track (32 $kgH_2$), and hydrogen temperature −25.0° C. after the hydrogen cooler, the desorption pressure is 370 bar. This case is advantageous as the cooling source of the metal hydrides compressor thermal management system, can be directly utilized for the hydrogen cooling. Other flow rates are also possible at the expense of increasing the desorption pressure and/or further reducing the hydrogen temperature.

Maintaining a thermal liquid flow rate of 7.5 m³/h as in the case of absorption results in a required inlet temperature of 110° C. to achieve a desorption pressure of 370 bar for the given material. The total energy requirement to compensate for the cooling effect of the desorption and to counter-balance the heat losses to ambient is 110.8 kWh$_{th}$ or around 3.5 kWh$_{th}$/kgH$_2$ based on a desorption enthalpy of 20.0 kJ/mol$_{H2}$. During this phase, the thermal liquid flows through the heating heat exhanger 30b and bypasses the dry cooler 30c and the cooling heat exchanger 30a. Given the time duration of the desorption and the energy requirement of this phase, the power to be delivered by the heating machine is 20.8 kW$_{th}$.

| Desorption | | | | | |
|---|---|---|---|---|---|
| Hydrogen storage-compression apparatus batch capacity (kg$_{H2}$) | 28 | 28 | 28 | 28 | 28 |
| Duration (min) | 5 | 8 | 15 | 29 | 116 |
| H$_2$ Flow Rate (kg$_{H2}$/h) | 336 | 224 | 116 | 58 | 15 |
| Thermal Power (kW$_{th}$) | 1196 | 798 | 413 | 206 | 52 |
| T$_{TF, in}$ | 110 | 110 | 110 | 110 | 110 |
| T$_{TF, out}$ | 107 | 107 | 107 | 107 | 107 |
| TF Flow Rate (1000 · kg/h); Water-Glycol (50%/50%) | 435 | 290 | 150 | 75 | 19 |
| TF Flow Rate (1000 · kg/h); Therminol | 756 | 504 | 261 | 130 | 33 |

Heat-Up

Once the absorption process is completed, the storage-compression units 4 are heated up from the absorption (−25.0° C.) to the desorption temperature (110° C.), due to the thermal liquid that flows initially through the dry cooler 30c and finally through the heating heat exhanger 30b. The heat-up is accompanied by an increase of the storage-compression units 4 internal pressure to 370 bar. During the initial phase of the heat-up, the flow through the dry cooler 30c allows the temperature of the storage-compression units 4 to increase from the absorption temperature to the ambient one. This energy is essentially provided for free. However, it requires a certain pumping power for the liquid flow through the dry cooler 30c. The total heat-up energy required is 5.4 kWh$_{th}$/kgH$_2$ (172.8 kWh$_{th}$) out of which 1.7 kWh$_{th}$/kgH$_2$ (55.1 kWh$_{th}$) is provided by the dry cooler 30c while the remaining energy 3.6 kWh$_{th}$/kgH$_2$ (117.2 kWh$_{th}$) from the heating heat exhanger 30b. During the heat-up process the flow rate is 7.5 m³/h.

To simplify the system, it is assumed that the same heating heat exhanger 30b is used as for the desorption. If the same electrical energy is provided to the heating heat exhanger 30b, the thermal power varies and is dependent on the coefficient of performance over this temperature range. The heat-up phase time duration is approximately 5 h, 20 min.

| Heat-Up | | | | | |
|---|---|---|---|---|---|
| Hydrogen storage-compression apparatus batch capacity (kg$_{H2}$) | 28 | 28 | 28 | 28 | 28 |
| Duration (min) | 5 | 8 | 15 | 31 | 124 |
| H$_2$ Flow Rate (kg$_{H2}$/h) | 0 | 0 | 0 | 0 | 0 |
| Thermal Power (kW$_{th}$) | 1196 | 798 | 413 | 206 | 52 |
| T$_{TF, in}$ | Varying | = | = | = | = |
| T$_{TF, out}$ | Varying | = | = | = | = |
| TF Flow Rate (1000 · kg/h); Water-Glycol (50%/50%) | 435 | 290 | 150 | 75 | 19 |
| TF Flow Rate (1000 · kg/h); Therminol | 756 | 504 | 261 | 130 | 33 |

Cool-Down

Following the end of the desorption, the storage-compression units 4 are cooled-down from the desorption (110.0° C.) to the absorption temperature (−25.0° C.). Similarly to the heat-up, all or most flow is initially directed through the dry cooler 30c to make use of the freely available ambient cooling. When the ambient temperature is reached, the flow is directed through the cooling heat exhanger 30a to achieve the subcooling to the absorption temperature. The total cool-down energy required is 4.7 kWh$_{th}$/kgH$_2$ (149.2 kWh$_{th}$) out of which 3.2 kWh$_{th}$/kgH$_2$ (101.5 kWh$_{th}$) is provided by the dry cooler 30c while the remaining energy 1.5 kWh$_{th}$/kgH$_2$ (47.7 kWh$_{th}$) from the cooling heat exchanger 30a. During the cool-down process, the flow rate is 7.5 m³/h.

The same cooling heat exchanger is used for the cool-down, resulting in a phase duration of 2 h, 11 min.

| Cool-Down | | | | | |
|---|---|---|---|---|---|
| Hydrogen storage-compression apparatus batch capacity (kg$_{H2}$) | 28 | 28 | 28 | 28 | 28 |
| Duration (min) | 4 | 5 | 11 | 21 | 85 |
| H$_2$ Flow Rate (kg$_{H2}$/h) | 0 | 0 | 0 | 0 | 0 |
| Thermal Power (kW$_{th}$) | 739 | 493 | 243 | 122 | 31 |
| T$_{TF, in}$ | Varying | = | = | = | = |
| T$_{TF, out}$ | Varying | = | = | = | = |
| TF Flow Rate (1000 · kg/h); Water-Glycol (50%/50%) | 268 | 179 | 88 | 44 | 11 |
| TF Flow Rate (1000 · kg/h); Therminol | 350 | 233 | 114 | 57 | 14 |

Examples of Industrial Applications

In an application, the hydrogen storage-compression system may advantageously be used as a system to refuel hydrogen-powered vehicles such a trucks or buses, which require a refuelling level of 350 bar. In such an application, the outlet pressure is typically ramped up to slightly exceed the pressure of the tanks to be refuelled (e.g., by 10 bar) by selectively adapting the heating power. In such an application, the typical desorption time can be as low as 5 to 15 minutes. In other cases, the desorption time can be 60 minutes or even 180 minutes or longer. In such an application, the typical inlet pressure ranges from 25 bar(g) to 35 bar(g). The typical cooling temperature ranges from −15° C. to −30° C. The typical heating temperature ranges from 90° C. to 130° C.

In another application, the hydrogen storage-compression system may advantageously be used as a system to refuel hydrogen-powered vehicles such as heavy-duty or light vehicles, which require a refuelling level of 700 bar. In such an application, the outlet pressure is typically ramped up to slightly exceed the pressure of the tanks to be refuelled (e.g., by 10 bar) by selectively adapting the heating power. In such an application, the typical desorption time can be as low as 5 to 15 minutes. In other cases, the desorption time can be 60 minutes or even 180 minutes or longer. In such an application, the typical inlet pressure ranges from 150 bar(g) to 350 bar(g). The typical cooling temperature ranges from 5° C. to −30° C. The typical heating temperature ranges from 60° C. to 130° C.

In another application, the hydrogen storage-compression system may advantageously be used as a system to refuel trailers, which require a refuelling level of 200 bar, for the transport or storage of hydrogen. In such an application, the outlet pressure is typically ramped up to slightly exceed the pressure of the tanks to be refuelled (e.g., by 10 bar) by selectively adapting the heating power. In such an application, the typical desorption time can be as low as 60 minutes. In other cases, the desorption time can be 180 minutes or even 300 minutes or longer. In such an application, the typical inlet pressure ranges from 25 bar(g) to 35 bar(g). The typical cooling temperature ranges from −15° C. to −30° C. The typical heating temperature ranges from 90° C. to 130° C.

LIST OF REFERENCES USED

Hydrogen source 101
Hydrogen consumer 102
Hydrogen storage-compression system 1
  Hydrogen storage-compression apparatus 2
    Casing 3
      Casing internal chamber 12
      Hydrogen Inlet/outlet 14
      Thermal liquid inlet 16
      Thermal liquid outlet 18
    Storage-compression units 4
      Containers 20
      Metal hydride 22
      Gas circuit flow system 24
  Thermal management system 5
    Thermal liquid circuit system 6
      Thermal liquid pump 26
      Thermal liquid 28
    Heating exchanger system 7
      First heat exchanger 30a
      Second heat exchanger 30b
    Heating source 8
    Cooling source 9
    Control system 10
      Pressure sensors P
      Temperature sensors T
      Valves V
Storage-compression container diameter D
Gap distance between adjacent containers G
Length of a container L

What is claimed is:

1. A hydrogen storage-compression system comprising:
a hydrogen storage-compression apparatus;
a thermal management system; and
a control system,
wherein the hydrogen storage-compression apparatus includes a casing and a plurality of storage-compression units mounted within an internal chamber of the casing, wherein each storage-compression unit includes a container and a metal hydride configured for hydrogen storage-compression contained within the container, wherein the plurality of storage-compression containers are interconnected by a hydrogen gas circuit flow system to a hydrogen inlet and outlet for connection to a hydrogen consumer and a hydrogen source,
wherein the thermal management system includes a thermal liquid circuit system and a heat exchanger system,
wherein the thermal liquid circuit system includes
  a closed loop thermal liquid flow circuit,
  a thermal liquid contained and flowing within a thermal liquid flow circuit, and
  a thermal liquid pump for pumping the thermal liquid in the thermal liquid flow circuit,
wherein the thermal liquid flow circuit is
  connected to a thermal liquid inlet and a thermal liquid outlet of the casing for flowing thermal liquid through casing internal chamber around the containers of the storage-compression units for cooling or heating thereof, and
  coupled to at least a first heat exchanger thermally coupled to heating source and to a second heat exchanger thermally coupled to a cooling source, and
wherein the control system is connected to the thermal liquid circuit system for controlling the flow of the thermal liquid in the circuit and through the heat exchangers.

2. The hydrogen storage-compression system of claim 1, wherein the thermal management system comprises a dry cooler thermally coupled to the thermal liquid flow circuit.

3. The hydrogen storage-compression system of claim 1, wherein the thermal management system comprises one or more additional heat exchangers thermally coupled to the thermal liquid flow circuit.

4. The hydrogen storage-compression system of claim 3, wherein the one or more additional heat exchangers comprise:
a heat exchanger for waste heat recovery thermally coupled to an industrial process output; and/or
a heat exchanger for free cooling.

5. The hydrogen storage-compression system of claim 1, wherein the thermal liquid is selected from any one or more of a water-ethylene glycol mixture, a silicon oil, or a synthetic hydrocarbon oil.

6. The hydrogen storage-compression system of claim 1, wherein the thermal liquid comprises a water-ethylene glycol mixture in a proportion of water to ethylene glycol in a range of 45% to 55% to 55% to 45%, or in a range of 50% to 50%.

7. The hydrogen storage-compression system of claim 1, wherein the metal hydrides contained in the storage-compression units are of the material class AB2 with a composition of $Ti_xZr_yCr_aMn_bFe_cNi_dCu_eV_fRe_g$, in which x, y, a, b, c, and d are molar ratios, Re is selected from La and Ce; $0.2 \leq x \leq 0.95$; $0.05 \leq y \leq 0.45$; $0.001 \leq a \leq 1$; $0.3 \leq b \leq 2$; $0.01 \leq c \leq 0.6$; $0.005 \leq d \leq 1.5$; $0 \leq e \leq 0.1$; $0 \leq f \leq 0.5$; $0.01 \leq g \leq 0.05$; and a+b+c+d+e+f+g=1.9 to 2.3.

8. The hydrogen storage-compression system of claim 1, wherein the metal hydrides contained in the storage-compression units are of the material class AB5 with a composition of $La_xCe_yMl_{(1-x-y)}Ni_a Co_bFe_cM_d$, in which x, y, a, b, c and d are molar ratios, where Ml is at least one element selected from Y, Ti, Zr and M is selected from Cu and Mn; $0.15 \leq x \leq 0.95$; $0.05 \leq y \leq 0.85$; $0 \leq (1-x-y) \leq 0.1$; $3.8 \leq a \leq 4.2$; $0.1 \leq b \leq 1.2$; $0.01 \leq c \leq 0.3$; $0 \leq d \leq 0.1$; $4.8 \leq (a+b+c+d) \leq 5.15$.

9. The hydrogen storage-compression system of claim 1, wherein the casing and the thermal liquid flow circuit are configured to withstand an internal pressure of at least 2 bar.

10. The hydrogen storage-compression system of claim 1, wherein the control system is connected to valves of the hydrogen gas circuit flow system and to pressure sensors and temperature sensors connected to the hydrogen gas circuit flow system to control the inflow and outflow of hydrogen from the hydrogen storage compression system to and from the hydrogen source and the hydrogen consumer.

11. The hydrogen storage-compression system according to claim 1, wherein each storage-compression container (comprises a tubular container wall having a diameter D in a range from 1.5 cm to 10 cm, and wherein adjacent ones of said plurality of storage-compression containers of said at least one multi-container unit are separated by a gap G having a length in a range between 0.02×D to 1×D.

12. The hydrogen storage-compression system of claim 11, wherein the diameter D of the tubular container wall of each storage-compression container is in a range of 2 cm to 8 cm or in a range of 3 cm to 6 cm.

13. The hydrogen storage-compression system of claim 11, wherein the gap G between the storage-compression containers is in a range of $0.1 \times D$ to $0.5 \times D$.

14. The hydrogen storage-compression system of claim 11, wherein the storage-compression containers have a length in a range of 60 cm to 200 cm or in range of 80 cm to 150 cm.

15. The hydrogen storage-compression system of claim 1 used as a near-isobaric hydrogen supply system to absorb and desorb hydrogen at elevated pressure greater than 50 bar or greater than 200 bar, and desorb hydrogen at substantially constant pressure with a temperature change of less than 40° C. or with a temperature change in a range of 20° C. to 30° C.

* * * * *